United States Patent
Steelberg et al.

(10) Patent No.: US 9,282,370 B2
(45) Date of Patent: *Mar. 8, 2016

(54) OPEN API DIGITAL VIDEO RECORDER AND METHOD OF MAKING AND USING SAME

(71) Applicants: Ryan Steelberg, Irvine, CA (US); Chad Steelberg, Newport Beach, CA (US)

(72) Inventors: Ryan Steelberg, Irvine, CA (US); Chad Steelberg, Newport Beach, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/335,966

(22) Filed: Jul. 21, 2014

(65) Prior Publication Data

US 2014/0337911 A1  Nov. 13, 2014

Related U.S. Application Data

(63) Continuation of application No. 12/218,345, filed on Jul. 14, 2008, now Pat. No. 8,819,756.

(60) Provisional application No. 60/959,395, filed on Jul. 13, 2007.

(51) Int. Cl.

| | |
|---|---|
| H04N 7/173 | (2011.01) |
| H04N 21/443 | (2011.01) |
| G06F 9/44 | (2006.01) |
| G11B 27/10 | (2006.01) |
| H04N 21/4147 | (2011.01) |
| H04N 21/84 | (2011.01) |
| H04N 9/87 | (2006.01) |
| H04N 21/845 | (2011.01) |

(52) U.S. Cl.
CPC .......... *H04N 21/4431* (2013.01); *G06F 9/4428* (2013.01); *G11B 27/105* (2013.01); *H04N 9/87* (2013.01); *H04N 21/4147* (2013.01); *H04N 21/84* (2013.01); *H04N 21/845* (2013.01)

(58) Field of Classification Search
CPC . H04N 21/84; H04N 21/845; H04N 21/4431; H04N 21/4147; H04N 9/87
USPC ......... 725/100, 105, 109, 110, 131, 132, 133, 725/134
See application file for complete search history.

(56) References Cited

U.S. PATENT DOCUMENTS

| | | | | |
|---|---|---|---|---|
| 8,095,466 B2* | 1/2012 | Kahn et al. | ...................... | 705/51 |
| 2005/0137958 A1* | 6/2005 | Huber et al. | .................... | 705/37 |

* cited by examiner

*Primary Examiner* — John Schnurr
(74) *Attorney, Agent, or Firm* — Barnes & Thornburg LLP; Thomas J. McWilliams; Edward F. Behm, Jr.

(57) ABSTRACT

A digital video recorder is disclosed. The digital video recorder includes at least one memory device, a plurality of communication access points for receiving at least one program play, an open application programming interface associated with the at least one memory device, and at least one correlation engine in communication with the open application programming interface. The plurality of applications correspondent to the open application programming interface allow a user to manipulate metadata associated with ones of the programs plays and the metadata relates to interframe interactivity with detailed aspects of the ones of the program plays. The at least one correlation engine provides for correlation among at least for the interframes of the program play to ones of the interframes of other ones of the program plays, and among the interframe interactivity to the interframes of the program play to interframe interactivity with the other ones of the interframes of the other ones of the program plays.

19 Claims, 3 Drawing Sheets

OPEN API DIGITAL VIDEO RECORDER AND METHOD OF MAKING AND USING SAME

CROSS REFERENCE TO RELATED APPLICATIONS

This application is a continuation of U.S. patent application Ser. No. 12/218,345, entitled OPEN API DIGITAL VIDEO RECORDER AND METHOD OF MAKING AND USING SAME, filed Jul. 14, 2008, which claims priority under 35 USC 119(e) to U.S. Patent Application No. 60/959,395, entitled OPEN API DIGITAL VIDEO RECORDER AND METHOD OF MAKING AND USING SAME filed Jul. 13, 2007, with inventors Chad Steelberg and Ryan Steelberg, the entire contents of which are incorporated herein by reference.

BACKGROUND OF THE INVENTION

Field of the Invention

The present invention is directed to application software and, more particularly, to an open-API digital video recorder and a method of making and using same.

SUMMARY OF THE INVENTION

A digital video recorder is disclosed. The digital video recorder includes at least one memory device, a plurality of communication access points for receiving at least one program play, an open application programming interface associated with the at least one memory device, and at least one correlation engine in communication with the open application programming interface. The plurality of applications correspondent to the open application programming interface allow a user to manipulate metadata associated with ones of the programs plays and the metadata relates to interframe interactivity with detailed aspects of the ones of the program plays. The at least one correlation engine provides for correlation among at least for the interframes of the program play to ones of the interframes of other ones of the program plays, and among the interframe interactivity to the interframes of the program play to interframe interactivity with the other ones of the interframes of the other ones of the program plays.

BRIEF DESCRIPTION OF THE FIGURES

The present invention will be described hereinbelow in conjunction with the following figures, in which like numerals represent like items, and wherein.

DETAILED DESCRIPTION OF THE INVENTION

It is to be understood that the figures and descriptions of the present invention have been simplified to illustrate elements that are relevant for a clear understanding of the present invention, while eliminating, for the purposes of clarity, many other elements found in typical interactive and application programming interface (API) systems and methods. Those of ordinary skill in the art will recognize that other elements are desirable and/or required in order to implement the present invention. However, because such elements are well known in the art, and because they do not facilitate a better understanding of the present invention, a discussion of such elements is not provided herein.

Figure 1:
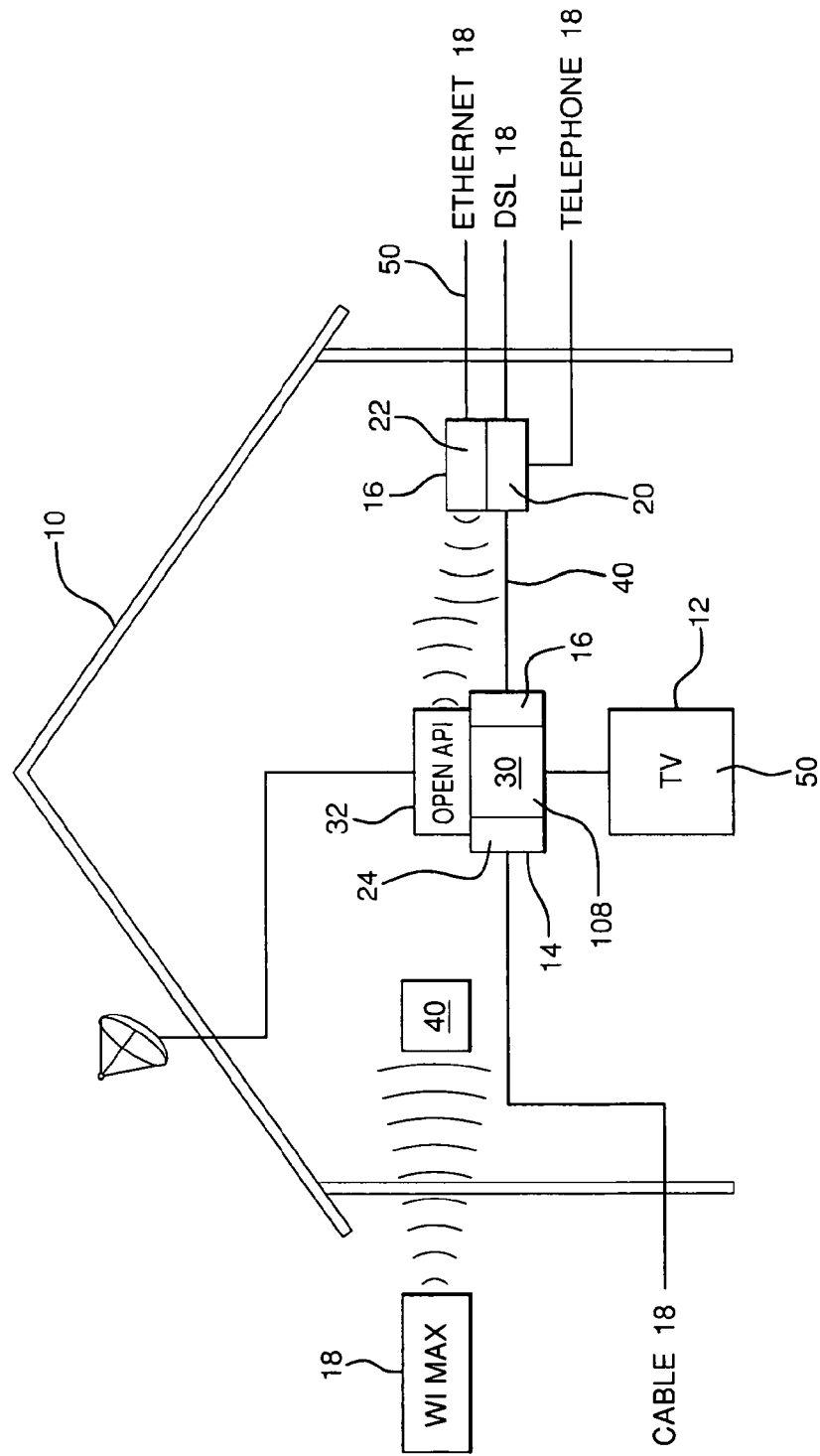
FIG. 1 is a block diagram illustrating a home having resident therein at least one television set having associated therewith at least one digital video recording unit.

FIG. 1 is a block diagram illustrating a home having resident therein at least one television set having associated therewith at least one digital video recording unit (hereinafter "DVR"). As defined herein, a DVR preferably includes at least one memory unit, such as a hard drive, RAM, flash memory, or the like, at least one communication access point, the capability to read metadata received via one of the communication access points, and the capability to write metadata related to a user's use of the DVR. Such communication access points may include one or more of, for example, satellite communication, coaxial cable communication, WiFi communication, WiMax communication (such as Sprint/Nextel, Tier 1, and Clearwire, Tier 3), other wireless LAN (local area network) communication, telephonic or DSL communication, T-111 or Ethernet communication, or the like. Further, the DVR preferably includes an operating environment that has associated therewith at least one application program interface (API). The at least one API allows for a programmer to write applications consistent with the operating environment. The API preferably includes a set of routines, protocols, and/or tools to allow for programmers to create software applications consistent with the operating environment, as will be apparent to those of ordinary skill in the art. Programs consistent with the API may be pushed or pulled to or by the DVR over the one or more communication access points in response to or as a command to the operating environment.

The DVR of the present invention may thus have accessible thereto a plurality of communication media types, including, but not limited to, cable television channels, satellite television channels, the worldwide web, email capabilities, data (including video and audio) libraries, and the like, each of which communication media types may form the basis for the creation of a "program play," in which one or more programs (audio or video) are presented to a user. In prior embodiments, television programs that play through the DVR have associated therewith a limited amount of metadata that is indicative only of "thematic", principally outerclip aspects of the television program, such as time of the program play, length of the program play, title of the program play, description of program play and significant actors or actresses associated with the program of the program play. The limited metadata associated with the program play received over one or more of the respective communication access points is then made available, in the prior art, for limited manipulation by the user with regard only to those aspects of the program play with which the thematic metadata is associated. Because the API of prior art DVR technology is closed, programmers are not universally afforded the opportunity to make greater use of information in any respective program play.

The present invention provides, via an open API DVR, an accessibility by the DVR to program plays or applications over any of a plurality of communication access point types mentioned hereinabove, as well as to play program plays of any communication media type as also mentioned hereinabove. As such, a myriad of applications may be written by programmers for operation on or in any of the variety of communication media, and for operation over nearly any communication access point type, and such applications may be pushed, pulled, or accessible over any of the aforementioned communication access points. Further, such application may allow for pushing or pulling for numerous interactivity types, including server interactivity, peer interactivity (including point-to-point sharing), and program play feed interactivity, for example. Such interactivity may be via an accessing of exposed application hooks to the aforementioned metadata.

Such applications written for the open API of the present invention may provide improved interactivity by, for example, exposing via the application metadata associated with each and every aspect of the program play on any given communication media. For example, metadata may be associated with each word spoken, sound made, and picture shown in any given program play, such as a television or radio program, and as such programmers may expose via the open API information not merely contained within or directly associated with the program play, but that is rather associated with the metadata associated with the program play. The metadata employed in the present invention is discussed further hereinbelow with respect to FIGS. 2 and 3. The metadata may be made accessible to the user via, for example, application software in the form of a program play overlay, in which an overlay-user interface is placed at the forefront of the program play currently in view of the user, which program play is a television program in the example immediately hereinabove. Such an overlay may take the form of, for example, an overlay that provides links, dropdown menus, windows, or other readily accessible user interfaces. Further, it will be evident to those of ordinary skill in the art that applications may be written that provide multiple windows, menus, or the like simultaneously to a single user, wherein each window plays over a television interface and provides a different program play, and consequently a different overlay, to the user, thereby providing an enhanced version of the known "picture in picture" program plays.

As mentioned hereinabove, the metadata associated with a particular program play of a particular communication media may allow for a "hook" to accessibility of any aspect of the program play, including, but not limited to, externally accessible media, such as other program plays starring the same actor, other program plays starring the same musician, advertising related to goods illustrated in the program play, purchasing points for goods illustrated in the program play, external information, such as World Wide Web (www or Web) information regarding items illustrated in the program play, and the like. Such external information may be accessible via a user activation of aspects of an overlay on the program play, or the accessing of certain aspects of an overlay or the program play itself may lead the user to menus, windows, or the like outside the program play, and the desired information may be accessible from such menus, windows, or the like.

In an exemplary embodiment of the present invention, the open API DVR may allow for an application having an eBay® overlay to be placed on a particular television show, such as "The Antiques Roadshow", and the user may thereby access, via the overlay, similar items available on eBay® to those items being illustrated in the show. Alternatively, rather than the eBay® overlay being placed upon The Antiques Roadshow (the program play of the communication media television), which is received by the DVR via the communication access point cable or satellite, eBay®, an affiliate, or a third party programmer may create a unique channel for reception by the DVR over a different communication access point, which eBay channel shows still photographs, videos, audio, or the like, that relate to items of frequent interest to buyers of eBay® goods, and the eBay® overlay may be placed thereover to allow a user to access further information with regard to those goods or access points of purchase, such as by moving the user to the World Wide Web upon activation by the user of aspects of the overlay. As such, eBay® may create its own unique communications media channel for display over television and may send this new channel for communication to the DVR via WiMax or the like, and as such new "television channels" can be created for access via communication access points not generally used currently by televisions.

In an additional exemplary embodiment, a user may be viewing a highly fashion-related program play, such as Desperate Housewives on ABC, in which different fashions or accessories are highly prevalent. If all such information associated with that program play is metatagged, the user may access information on the fashions being worn, or the accessories being used, and such information may include accessibility to other external information, such as comments from fashion editors, available purchase points of the items of interest, and external payment sites to allow for the purchase of those items of interest.

In an additional exemplary embodiment, a user may enter, to an application pulled to the DVR via the open API, a list of that user's fantasy sports players. The present invention may make available to that user a menu listing those fantasy sports players, and the location at which those fantasy sports players may be watched, recorded, or auto-recorded, on any communication media via any communication access point, in real time. Additionally, certain players may be highlighted, such as when that particular player's team possesses the ball, so that the user may switch between communication media or communication access points to, in a targeted manner, allow that user to watch, record, or auto-record that user's players. Additionally and alternatively with regard to this exemplary embodiment, an application may allow the user to open multiple windows to watch multiple of that user's players in real time, and may maintain in each window an overlay, or may display in a separate window the menu of fantasy players, or may allow the user to toggle between the menu and the video or audio of the games being played.

Thus, for example, a user may select what events certain actions by the DVR are to trigger on, such as autorecording certain events, such as each time a football running back entered into the fantasy football menu interface scores a touchdown. As such, a user can create his or her favorite, or most frequently accessed, metatags, and the metatags may be placed on all content, and on the user's accessing of all content.

In a broader sense, these exemplary embodiments illustrate that one or more applications pulled or pushed via the open API to the DVR may allow the user to assess, in real time, and/or watch, or auto-record, multiple programs, portions of programs, snippets, ads, or the like of interest, inside or outside of any program play (such as via a selectable toolbar generated in accordance with a unique application), use multiple windows of interest simultaneously, be presented with multiple overlays of interest, be presented with multiple menus of interest, all of which may allow the user to access multiple pieces of information or external information not currently available to the user via a television program play. Further for example, as discussed hereinabove, the user may use any application, such as a software overlay, while watching a football game for example, to access any information related to all or any portion of that program play, such as information on the types of shoes worn by that user's favorite player, where the user may buy the jersey worn by that user's favorite player, may access an online purchase point for those shoes or that jersey, and/or may pay using an on-line point of payment account, such as PayPal, all from the DVR of the present invention.

As such, the present invention may also provide a highly targeted marketing tool for advertisers, in that each user will access information of interest to that particular user, thereby ensuring that an advertiser's advertisement is played to a user that is most interested in the item being sold. Thereby, advertisers will have less need to place ads in program plays in which 99% of the viewers of the program play are not interested in the item being sold. Further, the present invention will allow such commerce interaction by each user to be uniquely tracked.

Not only will the addition of metadata add more targeted marketing opportunities, such as to make television ads into drill downs rather than just thirty second videos, but additionally the addition of metadata will allow "add-on programming" associated with television shows, which is presently found on line on the Web, to be brought back to the television media. For example, on line universes that are created for association with shows on television may, via metadata, menus, and/or overlays that access the metadata, allow for those on-line universes to be brought back on to television.

Further, the applications written for the DVR of the present invention may, as do present DVR's, collect metadata on use by the user of the DVR, as mentioned hereinabove. Without violation of privacy laws, such information may, using the applications for the open API discussed herein, be passed to third parties and the metadata may be collected, thereby allowing third parties to generate yet more targeted advertising, more targeted programs plays, and more communication media (such as communication channels) of interest to the highest number of users.

In light of that discussed hereinabove, the open API of the DVR of the present invention may provide hooks into all items of interest and into the operating environment of the DVR, and the exposure of those hooks via the open API will allow third parties to tie into those hooks. Further, users can access applications associated with those hooks via the metadata tags associated with those hooks. Such metadata tags may allow, for example, applications that make use of overlays, video overlays, water marking, auto pause, auto record, toolbars, menus, and the like. The applications so generated may be locally processed on the DVR (such as for certified applications), or can be streamed to the DVR, or can be associated with entirely new, externally generated communication channels. Additionally, as discussed hereinabove, although the DVR may have associated therewith some local storage, vast quantities of remote storage may be made available, such as at external sites accessible via WiMax or the like. As such, a user may be charged for any level of desired storage for programming, and will not be limited for storage by the hardware of the DVR resident within the user's home.

Thus, the present invention may make available any of a variety of communication channels, and any of a variety of applications for accessing metatags associated with the communication media being played on any of those communication channels. For example, a real estate channel may be made available, and the real estate available on the real estate channel may be targeted to the preferences entered by the user of interest. Alternatively, a completely interactive gaming channel may be made available wherein trivia games, casino games, or the like may be made available in accordance with user preferences, and actions undertaken by the user may be received by the DVR as metadata that may be made available to third parties. Alternatively, complex interfaces may be made available via a metadata feed. For example, a user may watch a nature show on the Discovery Channel, and may hear or see mention of an animal of interest to that user. The user may then access, such as via an overlay, a link associated with that animal of interest. That link may provide the user with access to, for example, Google Earth, which may allow for illustration to the user of all animals of that type, anywhere in the world, that have been tagged and placed back into the wild and that are open to sponsorship by a user. The user may be then given the option to sponsor one of the animals in a location of interest to the user, and in the event the user selects an animal to sponsor, an on-line payment interface, such as PayPal, may be accessible to the user for payment of the sponsorship fee. Alternatively, either within the program play on the Discovery Channel, or after drilling down to the animal of interest, the user may be presented with a mention of a country of interest to the user, such as Botswana. The user may pause, and either exit the program play via the overlay, or may exit the Google Earth interface displaying the animals of interest, and may redirect to find information, such as on Wikipedia, on "Botswana." After the user has redirected a sufficient number of times to receive the information of interest to the user with regard to Botswana, the user may elect to be redirected back to the initial location of interest, which in this example is either the program play or the information on the animal of interest.

The present invention may also include social networking. Such social networking may include videoconferencing, video messaging, or placement of personal information or personal ads on line, or placement of video or audio generated by a user that the user would like to make accessible to third parties, from the communication access points accessible to the user via the open API DVR, thus making the user "the star of" his or her own show.

The present invention may additionally include, for example, a mobile DVR, wherein DVR features accessed via mobile televisions, televisions not within the home residence, navigation screens within vehicles, or the like, accessible to any of the aforementioned communication access points, and such mobile DVR may communication with the home, open API DVR.

More specifically with regard to the above-referenced metatagging, the metatagging of the present invention is typically to take place interclip, and may be thematically or non-thematically related. More specifically, the tagging may be done interclip and interframe, and/or frame-by-frame, and may relate to words, pictures, and the like that occur within the frame, whether or not related to the thematic nature of the programming. Such tags may be associated with the interframe programming by, for example, the automatic nature of the application then running, may be inserted remotely at the programming for the programming displayed, or may inserted by the users as the programming is viewed. Further, such tagging allows for actions to be taken on discrete portions of an overall program play, unlike the actions made available by the prior art. Additionally, such metatags may be streamed in-content, or in a separate metastream tied to the program play, as discussed with particularity immediately hereinbelow.

As will be apparent to those skilled in the art, a metatag as used herein is a computer-readable language, such as xml, html, or the like, syntax statement that may be sent along with a program play, such as by being sent as a secondary stream fed to a user along with a streamed program play, or that may be sent as part of a program play, such as in the "header" information that describes the computing characteristics of the program play. The metatag may convey information about that with which it is associated (i.e. the program play in this example), and such information may or may not actually be found within such a program play. For example, such metatags may be hooks, such as for user commands, or may make requests of the user, or may be used as keywords in searching of program plays or program play portions. Each such metatag must be given a unique name, or tag, and have associated therewith unique content. Such association of keywords and content may be done automatically, such as by an automated search of a document, such as a script of a program play, or such as by spider searching, or such as by index searching, or may be done manually.

Further, metatags included within frames may be linked and/or correlated to other metatags, within or outside of the program then within view. For example, correlation may be performed from metatag to metatag, in frame, or from metatag to metatag from a frame of one program play to a frame in a separate program play, or from metatag to content stream, for example. Alternatively, correlation of metatag to metatag may occur from a frame within one program play to another frame within the same program play, or interframe between program plays. Correlation may be employed using authoring standard techniques and/or languages, such as Synchronized Multimedia Integration Language (SMIL) or Microsoft Synchronized Accessible Media Interchange (SAMI), among others, which may be separate from, and in a different syntax than, the program play stream(s). Further or alternatively, correlation functions and correlation branching known to those skilled in the art of mathematics may be employed by the applications programmed into the open API of the present invention, with regard to each frame, or frame portion, of every program play accessible to the open API DVR.

In certain exemplary embodiments, watermarking techniques typically employed for embedding correlated audiovisual interaction information may be used to correlate frames, inter-frames, or program plays in the present invention, with or without modification to the typical metatag data stream or headers (see, e.g., "Stream Based Interactive Video Language Authoring using Correlated Audiovisual Watermarking," Xu, et al., ICITA '05 Proceedings, IEEE). Further, as such, upon placement into or into association with the program play, inframe metatags may have correlated therewith not only aspects of inframes of other program plays, but additionally any of the number of functions to be performed by the respective applications discussed herein throughout.

The association of metatags to other metatags may, in fact, create "clickable video." Clickable video provides true interactivity to a watcher of any program play that presents the video to the user. As such, for example, the user may pause the video and use display objects known to those skilled in the art, such as a mouse cursor, to interact with portions of the video, or may call up such an interactive cursor to interact with the video while the video is playing. Further, metatagging may allow for variations in the mouse cursor that correspond to those aspects of the video currently playing when the mouse cursor is brought up on the screen. For example, if a portion of the video includes an actor in the video drinking a can of Coke, the mouse cursor, if called during that portion of the video, might display as a miniature can of Coke.

Thus, once the metastream is defined, clickable video frames can be created, correlation to the same or other metastreams may be performed, and passive processing may be performed with third party API's. Such third party processing may include, for example, remote commands such as DVR commands, that may, for example, allow for the taping of certain snippets of interest within larger program shows.

The manner of metatagging used in the present invention may, for example, be any methodology of metatagging known to those skilled in the art. Further, a program play may be metatagged before initial broadcast, before rebroadcast, or during the streaming of a broadcast stream. As such, rights in such metatagging may be available and divisible by pre-initial broadcast, in-broadcast, and rebroadcast, for example.

Figure 2:
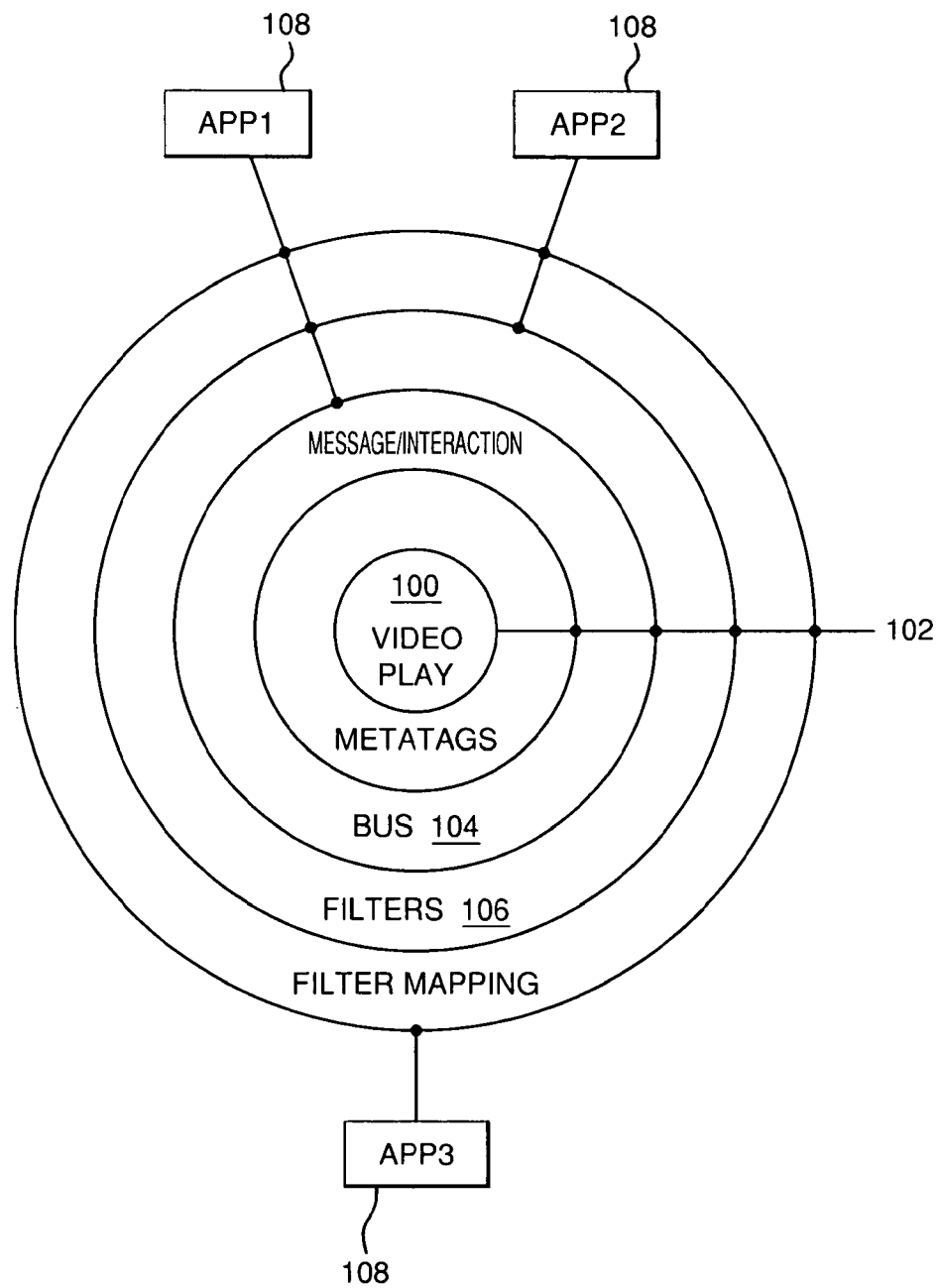
FIG. 2 illustrates a video which will be displayed to the user as a program play; and, FIG. 3 is an example illustrating certain applications and/or filters interacting with the message bus and having associated therewith core applications, and may be surrounded by metatags in a manner similar to the base video of interest.

The present invention may be hierarchically organized as shown in FIG. 2. FIG. 2 illustrates, as the focal point of the present invention, a video which will be displayed to the user as a program play. The video is metatagged as shown, and the hierarchy outside, but associated with, the metatags may then communicate with and using the metatags via a message bus. Surrounding the message bus may be a variety of filters, and surrounding the filters may be a variety of applications. The applications may access any of a number of the filters, and both the applications and the filters may have accessible thereto the message bus. The message bus may make available a variety of operation commands for interaction with the metatags, and the metatags may provide interoperability of the commands with the video.

The filters may be mapped into a variety of commands made available in the message bus, and thus the filters may be of a variety of types. For example, filters may include key word filters, commerce-type filters, location filters, geolocation filters, correlation filters, insertion filters such as for secondary feeds, and social filters, programmatic publishing filters, automatic publishing filters, and the like. The mapping of user commands performed by the filters, and performed by the applications that run the filters, may cause the application of one filter type to be a causation for application of a filter of another type. As such, applications can likewise feed one another, such as wherein an application of one type, such as a search application, accesses an application of another type, such as a Wikipedia engine, whereby answers to a user inquiry into a search engine can be obtained.

Further, for example, one application and/or filter may allow the saving of certain aspects of a program based on the application of another application indicating that the user wishes to seek certain snippets associated with certain topics. Further, once such snippets are saved, yet another application may allow the shipment of the frames or snippets of interest, based on the metadata illustrating that such frames are of interest, between users, such as via email programs, internet mail or WiFi for example. Additionally, as mentioned hereinabove, the open API aspects of the DVR of the present invention may allow for programmatic publishing, wherein an application actively publishes certain metadata or certain information received into the programming via, for example, automatic publishing (wherein such publishing occurs passively).

Figure 3:
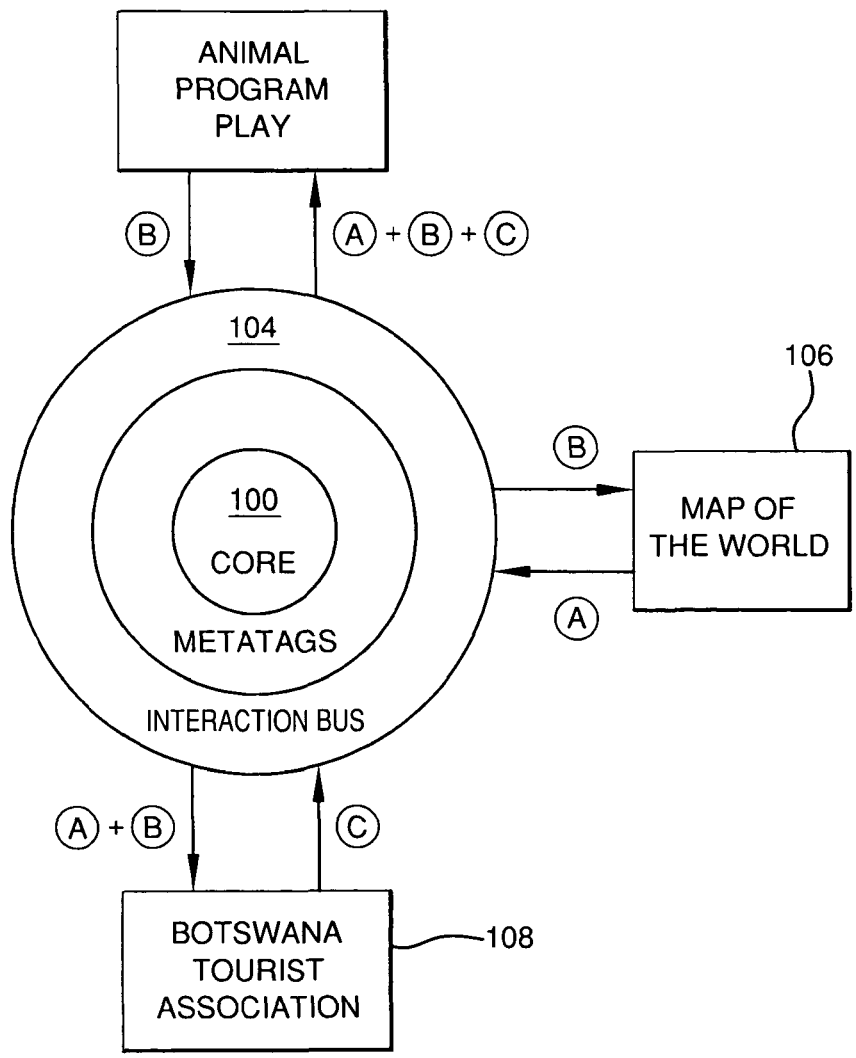

In a more specific example illustrated in FIG. 3, certain applications and/or filters interact with the message bus. As illustrated, the applications and/or filters may have associated therewith core applications, and may be surrounded by metatags in a manner similar to the base video of interest. In an exemplary embodiment, the metatags of the application into which the user expresses interest in the location of certain animals of the world may come from a mapping application, wherein interaction B, as shown, interacts with the message bus based on the interaction B from the user. The metatag reached by interaction B may be a geographic location within a program then within view of the user, and may lead to interaction A reaching out to make other assessments of the user's mapped location of interest. For example, a different application may then be accessed by the first application based on the correlation of interactions A and B, and this different application may assess a variety of different animals, available animal sponsorships, records of national disasters, phone books, flora, or the like, that are resident in that particular geographic location. Such information may then be fed back to the user via the message bus interface, or the interest from the user may simply be written to the external application, and may be tracked by the application programmer. As such, multiple applications may collaborate as between the applications, may correlate as between the applications, and may filter as between the applications, and such actions may occur automatically, via programmatic publishing, and/or may be based on certain permissions.

The filtering and applications of the present invention made available via the open API DVR interface may thus be dependent on the capability to create an instream metastream that is not necessarily thematically related to any of the programs shown to the user. Such an instream metastream may include a metastream associated with any instream programming, which may include not only the programming of interest but also advertising associated with, or accessible from, the programming of interest.

Although the invention has been described and pictured in a preferred form with a certain degree of particularity, it is understood that the present disclosure of the preferred form has been made by way of example, and that numerous changes in the details of construction and combination and arrangement of parts and steps may be made without departing from the spirit and scope of the invention.

The invention claimed is:

1. A digital video recorder (DVR), comprising:
   at least one memory device;
   a communication access point for receiving at least one program play;
   an open application programming interface associated with said at least one memory device, wherein a plurality of applications using said open application programming interface (API) allow a user to interact directly with a display of the program play, based on metatags associated with at least one prevalent object appearing in one of the programs plays, wherein said metatags provide for viewer interactivity directly with the metatagged object appearing in the program plays, and wherein the interactivity includes access to externally accessible media, information in the world wide web advertising and/or purchasing points external to the DVR and having a predetermined relationship with the metatagged object of the program plays;
   a correlation engine in communication with said open application programming interface, wherein said correlation engine relates metatagged object in a portion of one program play and corresponding interactivity provided thereby, to metatagged similar objects appearing in others of the program plays, and in other portions of the same program play, for use by at least a portion of the plurality of applications that use the open API to employ correlation functions and correlation branching with regard to program plays accessible DVR; and
   an instream metastream that is correlated to the program play shown to the user, said instream metastream being thematically unrelated to the program play.

2. The digital video recorder of claim 1, wherein the metadata associated with ones of the programs plays includes a computer-readable language.

3. The digital video recorder of claim 1, wherein the metadata associated with ones of the programs plays conveys information about the program play.

4. The digital video recorder of claim 3, wherein the conveyed information is not found within the program play.

5. The digital video recorder of claim 1, wherein the conveyed information includes links to other metatags.

6. The digital video recorder of claim 1, wherein the conveyed information includes correlations to other metatags.

7. The digital video recorder of claim 6, wherein the correlations are outside of the program that is within view.

8. The digital video recorder of claim 1, further comprising a watermark, wherein said watermark embeds correlated audiovisual interaction information used to correlate frames.

9. The digital video recorder of claim 8, wherein the watermark does not require modification of the typical metadata.

10. The digital video recorder of claim 1, further comprising the association of metatags to other metatags.

11. The digital video recorder of claim 10, wherein the association creates clickable video.

12. The digital video recorder of claim 1, wherein in the metadata is created before the initial broadcast of the program play.

13. The digital video recorder of claim 1, wherein in the metadata is created before the rebroadcast of the program play.

14. The digital video recorder of claim 1, wherein in the metadata is created during streaming of a broadcast of the program play.

15. The digital video recorder of claim 1, wherein the metadata is presented in a hierarchical organization.

16. The digital video recorder of claim 15, wherein the hierarchical organization includes at least one filter.

17. The digital video recorder of claim 16, wherein the at least one filter is mapped into at least one command.

18. The digital video recorder of claim 1, wherein said instream metastream includes a metastream associated with instream programming, wherein said instream programming includes programming of interest and advertising associated with said programming of interest.

19. The digital video recorder of claim 1, wherein said instream metastream is accessible via a permission based access point.

* * * * *